G. A. WIRT.
BROADCAST SOWER.
APPLICATION FILED JULY 28, 1917.
1,259,187.
Patented Mar. 12, 1918.
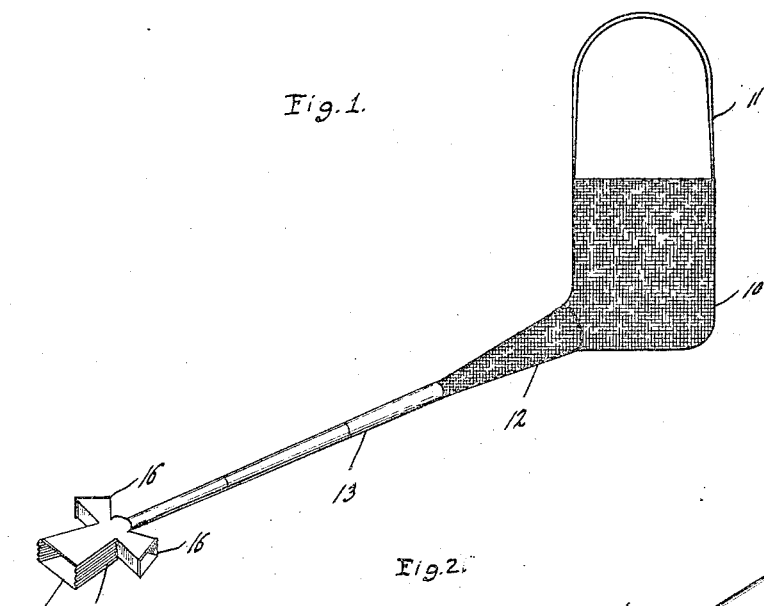
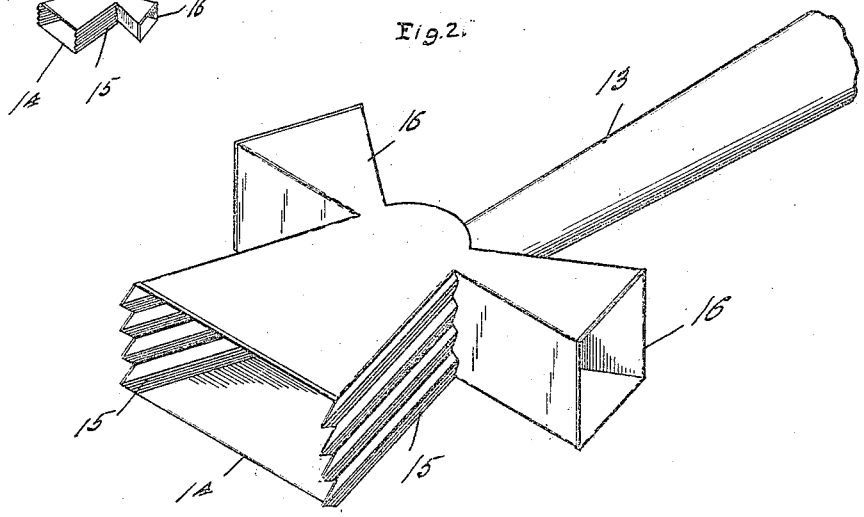
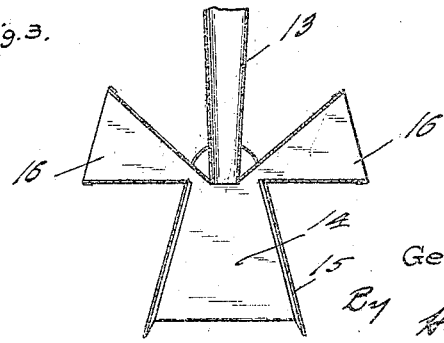
Witness
Frank A. Fable
Inventor
George A. Wirt,
By Hood & Schley.
Attorneys

UNITED STATES PATENT OFFICE.

GEORGE A. WIRT, OF GREENSBURG, INDIANA.

BROADCAST SOWER.

1,259,187.  Specification of Letters Patent.  Patented Mar. 12, 1918.

Application filed July 28, 1917. Serial No. 183,228.

*To all whom it may concern:*

Be it known that I, GEORGE A. WIRT, a citizen of the United States, residing at Greensburg, in the county of Decatur and State of Indiana, have invented a new and useful Broadcast Sower, of which the following is a specification.

It is the object of my invention to produce a broadcast sower for seed, such as grass, wheat, or even corn, whereby the seed may be evenly thrown broadcast by the sower walking over the field, with a minimum of effort.

The accompanying drawing illustrates my invention. Figure 1 is a perspective view of my broadcast sower, in position for use; Fig. 2 is a perspective view on a somewhat larger scale showing the delivery end of such sower; and Fig. 3 is a central longitudinal section through such delivery end.

A grain-carrying sack 10 is swung by a strap 11 on the sower's shoulder, usually under his left arm, and at its lower forward corner is provided with a tapered discharge funnel 12, of fabric, which is attached to the rear or receiving end of the hollow handle 13 of my broadcast sower. This hollow handle is conveniently made of sheet metal, preferably in several parts telescoped together, and conveniently is largest at its rear or receiving end. At is forward end, this hollow handle carries and opens into a delivery spout 14, which is preferably wedge-shaped with its apex attached to the forward end of the hollow handle 13 and with its wide end open. In order to get even distribution, the two flaring sides of the spout 14 are provided with longitudinal corrugations 15, along which the seed being delivered slides. Near where the spout 14 is joined to the hollow handle 13 it is provided on each of its flaring sides with a lateral, air-catching, wedge-shaped funnel 16, which is open at its wide end and at its narrow end communicates obliquely with the spout 14.

In operation, the sower hangs the seed-filled sack 10 on his shoulder and grasps the hollow handle 13 near its rear end, usually with his right hand, and swings the handle back and forth as he walks across the field. In thus swinging the handle, he does it with a motion so that its rear end where it is connected with the discharge funnel 12 of the sack is substantially the pivot point, and so that the air-catching funnels 16 are horizontal. The seed from the sack travels down through the hollow handle by gravity and centrifugal force, the amount of such seed being controlled in any suitable manner. The air catching funnels 16 catch the air as the device is swung back and forth, and discharge it as a stream into the narrow end of the spout 14, such stream of air entering from the funnel 16 which on any swing is the advancing funnel and being carried across the end of the hollow handle 13 where it leads into the spout 14 and thence to the corrugated side 15 which on that swing is the rearward side. This stream of air alternates from one air-catching funnel 16 to the other and from one corrugated side 15 to the other on alternate swings of the device. This stream of air across the end of the hollow handle 13 assists in carrying the seed from such hollow handle and along such corrugated side of the spout, and in distributing it from the spout over the field. By this broadcast sowing a substantially even distribution of the seed over the field may be obtained with a minimum of labor on the part of the sower.

I claim as my invention:

1. A broadcast sower, comprising a hollow handle to which seed is fed, said handle being provided at its discharge end with a wedge-shaped spout having longitudinal corrugations on the flaring sides.

2. A broadcast sower, comprising a hollow handle to which seed is fed, a flaring spout mounted on said hollow handle at its discharge end and fed therefrom, and air-catching funnels mounted on opposite sides of said spout near where it is connected to said hollow handle and having their small ends in position to discharge air within said spout across the discharge end of said hollow handle so that as the device is swung from side to side said funnels catch the air and force it in streams across the discharge end of said hollow handle and along the opposite side of the flaring spout.

3. A broadcast sower, comprising a hollow handle to which seed is fed, a spout mounted on said hollow handle at its discharge end and fed therefrom, and air-catching funnels mounted on opposite sides of said spout near where it is connected to said hollow handle and having their small ends in position to discharge air within said spout across the discharge end of said hollow handle so that as the device is swung from side to side said funnels catch the air and force it in streams across the discharge end of said hollow handle and along the opposite side of the spout.

4. A broadcast sower, comprising a hollow handle to which seed is fed, a spout mounted on said hollow handle at its discharge end and fed therefrom, and air-catching funnels mounted on opposite sides of said spout near where it is connected to said hollow handle and having their small ends in position to discharge air within said spout across the discharge end of said hollow handle so that as the device is swung from side to side said funnels catch the air and force it in streams across the discharge end of said hollow handle and along the opposite side of the spout, said spout being provided with longitudinal corrugations on the sides opposite said air-catching funnels.

5. A broadcast sower, comprising a hollow handle to which seed is fed, a spout mounted on said hollow handle at its discharge end and fed therefrom, and an air-catching funnel mounted on the side of said spout near where it is connected to said hollow handle and having its small end in position to discharge air within said spout across the discharge end of said hollow handle so that as the device is swung said funnel catches the air and forces it in a stream across the discharge end of said hollow handle and along the opposite side of the spout.

6. A broadcast sower, comprising a hollow handle to which seed is fed, a flaring spout mounted on said hollow handle at its discharge end and fed therefrom, and air-catching funnels mounted on opposite sides of said spout near where it is connected to said hollow handle and having their small ends in position to discharge air within said spout across the discharge end of said hollow handle at an acute angle to the handle so that as the device is swung from side to side said funnels catch the air and force it in streams obliquely across the discharge end of said hollow handle and along the opposite side of the flaring spout.

7. A broadcast sower, comprising a hollow handle to which seed is fed, a spout mounted on said hollow handle at its discharge end and fed therefrom, and an oblique air-catching funnel mounted on the side of said spout near where it is connected to said hollow handle and having its small end in a position to discharge air within said spout across the discharge end of said hollow handle at an acute angle to the handle so that as the device is swung said funnel catches the air and forces it in a stream obliquely across the discharge end of said hollow handle and along the opposite side of the spout.

8. A broadcast sower, comprising a hollow handle to which seed is fed, a spout mounted on said hollow handle at its discharge end and fed therefrom, an oblique air-catching funnel mounted on the side of said spout near where it is connected to said hollow handle and having its small end in a position to discharge air within said spout across the discharge end of said hollow handle at an acute angle to the handle so that as the device is swung said funnel catches the air and forces it in a stream obliquely across the discharge end of said hollow handle and along the opposite side of said spout, said funnel flaring in the plane in which both it and the spout lie and having its other sides substantially parallel.

In witness whereof, I have hereunto set my hand at Indianapolis, Indiana, this seventeenth day of July, A. D. one thousand nine hundred and seventeen.

GEORGE A. WIRT.

Copies of this patent may be obtained for five cents each, by addressing the "Commissioner of Patents, Washington, D. C."